United States Patent
Lim et al.

(10) Patent No.: US 9,100,204 B2
(45) Date of Patent: Aug. 4, 2015

(54) APPARATUS AND METHOD FOR BROADCAST IN SYSTEM PERFORMING INTER-DEVICE DIRECT COMMUNICATION

(75) Inventors: Chi-Woo Lim, Suwon-si (KR); Kyung-Kyu Kim, Seoul (KR); Seung-Hoon Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 177 days.

(21) Appl. No.: 13/597,658

(22) Filed: Aug. 29, 2012

(65) Prior Publication Data

US 2013/0051389 A1    Feb. 28, 2013

(30) Foreign Application Priority Data

Aug. 29, 2011   (KR) ................. 10-2011-0086494

(51) Int. Cl.
  *H04J 3/24* (2006.01)
  *H04L 12/18* (2006.01)
  *H04W 4/06* (2009.01)
  *H04W 72/00* (2009.01)

(52) U.S. Cl.
  CPC ............... *H04L 12/189* (2013.01); *H04W 4/06* (2013.01); *H04W 72/005* (2013.01)

(58) Field of Classification Search
  USPC .................. 370/389–390, 473, 474
  See application file for complete search history.

(56) References Cited

U.S. PATENT DOCUMENTS

| | | | |
|---|---|---|---|
| 7,787,906 B2 * | 8/2010 | Kondo ......................... 455/561 |
| 8,588,779 B2 * | 11/2013 | Chen et al. .................... 455/436 |
| 8,612,593 B2 * | 12/2013 | Henttonen et al. ............ 709/225 |
| 2006/0087996 A1 * | 4/2006 | Stephens ...................... 370/311 |
| 2007/0008922 A1 | 1/2007 | Abhishek et al. |
| 2008/0196073 A1 * | 8/2008 | Tango et al. .................. 725/109 |
| 2009/0019173 A1 | 1/2009 | Wu et al. |
| 2009/0116430 A1 | 5/2009 | Bonta et al. |
| 2010/0081454 A1 * | 4/2010 | Wang et al. ................ 455/456.1 |
| 2010/0198953 A1 | 8/2010 | Horn et al. |
| 2011/0103286 A1 | 5/2011 | Montojo et al. |
| 2011/0103290 A1 * | 5/2011 | Suzuki et al. ................. 370/312 |
| 2011/0206020 A1 | 8/2011 | Hollick et al. |
| 2011/0292856 A1 * | 12/2011 | Park et al. ..................... 370/311 |
| 2013/0028161 A1 * | 1/2013 | Maeda et al. ................. 370/311 |

* cited by examiner

*Primary Examiner* — Phuc Tran
(74) *Attorney, Agent, or Firm* — Jefferson IP Law, LLP

(57) ABSTRACT

A method and an apparatus for broadcasting data using a frame structure having a plurality of sections in a system performing inter-device direct communication are provided. In the method, whether there is data to broadcast is determined. Broadcast indicate information is exchanged with neighbor devices via a retrieve section for retrieving information about neighbor devices, the broadcast indicate information representing an indication of whether data is broadcast. A data transmission section is divided into a broadcast section and a unicast section. A broadcast signal is received during the broadcast section.

20 Claims, 4 Drawing Sheets

APPARATUS AND METHOD FOR BROADCAST IN SYSTEM PERFORMING INTER-DEVICE DIRECT COMMUNICATION

PRIORITY

This application claims the benefit under 35 U.S.C. §119 (a) of a Korean patent application filed on Aug. 29, 2011 in the Korean Intellectual Property Office and assigned Serial No. 10-2011-0086494, the entire disclosure of which is hereby incorporated by reference.

BACKGROUND OF THE INVENTION

1. Field of the Invention

The present invention relates to a system for performing inter-device direct communication. More particularly, the present invention relates to a method and an apparatus for a broadcast in a system performing inter-device direct communication.

2. Description of the Related Art

As a communication apparatus and a communication system evolve, there is an increasing desire by users for a service through which the users may easily obtain and share information at any time. Recently, with the introduction of a smart phone and a tablet Personal Computer (PC), an environment is provided that allows a user to obtain and share information via a wireless communication system. However, the information obtaining and sharing method of the related art is applicable to only a wireless communication system where an infrastructure has been established, and cannot efficiently provide real-time information due to the complexity of the wireless communication system or a time delay.

Accordingly, an inter-device direct communication service (referred to as D2D) for configuring a communication link between devices by directly sharing information between devices in an environment where a communication infrastructure has not been established emerges.

Devices supporting an inter-device direct communication service obtain synchronization with a neighbor device, and then perform a retrieve process with the neighbor device via a predetermined resource at a predetermined time point in order to obtain information about the neighbor device. Here, device information includes identity information of a relevant device, an interest field, and application program information. After that, each device generates a Connection IDentifier (CID) in order to connect to devices with which it desires to directly communicate based on the obtained neighbor device information, and performs direct communication based on the generated CID.

As described above, the inter-device direct communication scheme of the related art is a communication scheme suitable for one-to-one (1:1) unicast communication for transmitting/receiving a signal to/from another device, and is not suitable for (1:N)-type broadcast where one device simultaneously transmits a signal to a plurality of devices. That is, in a case of broadcasting according to the related art, it is inefficient for one device to generate a CID for each of a plurality of devices in order for one device to transmit/receive a signal to/from the plurality of devices. Furthermore, since a limited number of CIDs should be divided into a unicast CID and a broadcast CID, it is not efficient in an aspect of operating CIDs. More particularly, in a case of separately operating a CID for broadcast, it is not easy to determine the number of broadcast CIDs in advance. Also, in a case of variably changing the number of broadcast CIDs, a separate process for a variable CID is required. Accordingly, in the related art, overhead increases and inefficiency occurs.

Therefore, a broadcast communication scheme where one device simultaneously transmits a signal to a plurality of devices in an inter-device direct communication system should to be provided.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for broadcast in an inter-device direct communication system.

Another aspect of the present invention is to provide a method and an apparatus for informing whether to perform a broadcast via a process where each device performs a retrieve process for sharing information with a neighbor device in an inter-device direct communication system.

Another aspect of the present invention is to provide a method and an apparatus for setting in advance a portion of a data transmission section to a broadcast resource section and allowing each device to perform a broadcast via the resource section set in advance in an inter-device direct communication system.

Another aspect of the present invention is to provide a method and an apparatus for extending a broadcast resource set in advance depending on a circumstance and determining a unicast resource section depending on broadcast resource extension in an inter-device direct communication system.

Another aspect of the present invention is to provide a method and an apparatus for allowing each device to perform a broadcast using a limited broadcast resource in the case where there is a plurality of devices requiring broadcast.

In accordance with an aspect of the present invention, a method of a device for broadcasting data using a frame structure having a plurality of sections in a system performing direct communication between devices is provided. The method includes determining whether there is data to broadcast, exchanging broadcast indicate information with neighbor devices via a retrieve section for retrieving information about the neighbor devices, the broadcast indicate information representing an indication of whether data is broadcast, dividing a data transmission section into a broadcast section and a unicast section, and receiving a broadcast signal during the broadcast section.

In accordance with another aspect of the present invention, an apparatus of a device for broadcasting data using a frame structure having a plurality of sections in a system performing direct communication between devices is provided. The apparatus includes a transceiver for at least one of transmitting to at least one neighbor device and receiving from at least one neighbor device, and a controller for determining whether there is data to broadcast, for exchanging broadcast indicate information with neighbor devices via a retrieve section for retrieving information about the neighbor devices, the broadcast indicate information representing an indication of whether data is broadcast, for dividing a data transmission section into a broadcast section and a unicast section, and for receiving a broadcast signal during the broadcast section.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the exemplary embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method and an apparatus for a broadcast in an inter-device direct communication system. More particularly, exemplary embodiments of the present invention provide a method for allowing one device to broadcast a signal to a plurality of devices without generating a separate Connection IDentifier (CID) for inter-device communication in an inter-device direct communication system.

Generally, in an inter-device direct communication system, each device performs a retrieve process for sharing device information with a neighbor device by broadcasting its device information and receiving device information broadcast from the neighbor device via a predetermined resource at a predetermined time point for direct communication with a different device. According to exemplary embodiments of the present invention, each device can inform a neighbor device whether it broadcasts data using a broadcast characteristic of this retrieve process. That is, exemplary embodiments of the present invention propose a method of allowing each device to include a broadcast indicator in its device information that is transmitted during the retrieve process so that neighbor devices may recognize whether the each device broadcasts. Each device then broadcasts a signal via a predetermined data transmission resource. The broadcast indicate information represents an indication of whether data is broadcast during the data transmission section.

Figure 1:
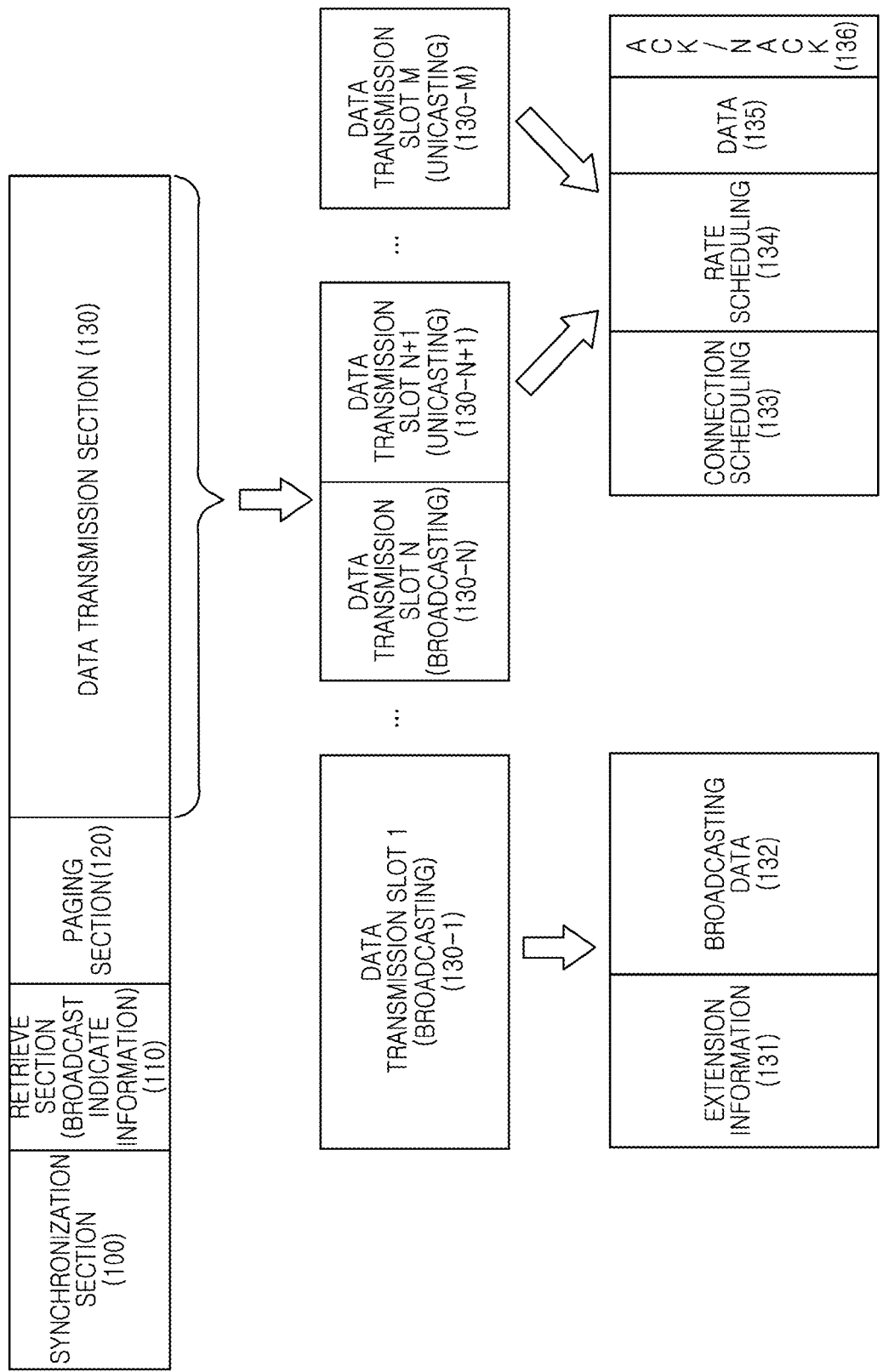
FIG. 1 is a view illustrating a frame structure in a system performing inter-device direct communication according to an exemplary embodiment of the present invention.

FIG. 1 is a view illustrating a frame structure in a system performing inter-device direct communication according to an exemplary embodiment of the present invention.

Referring to FIG. 1, the frame structure of the inter-device direct communication system includes a plurality of sections, namely synchronization section 100, a retrieve section 110, a paging section 120, and a data transmission section 130.

The synchronization section 100 denotes a section where each device obtains synchronization with a neighbor device.

The retrieve section 110 denotes a section where each synchronized device broadcasts its device information via a predetermined resource at a predetermined time point and receives information broadcast from a neighbor device so as to share information with the neighbor device. Here, the device information includes identifying information of a relevant device, an interest field, application program information, etc. According to the present exemplary embodiment, the device includes broadcast indicate information in its device information that is transmitted during the retrieve section 110 via which a signal is broadcast, so that neighbor devices may recognize whether the device broadcasts. The broadcast indicate information represents an indication of whether data is broadcast during the data transmission section.

The paging section 120 denotes a section for generating a CID for performing one-to-one communication between devices. However, as proposed by the present exemplary embodiment, since devices performing data broadcast do not require the CID, the paging section 120 may be omitted. In other words, a device that intends to perform a data broadcast may omit a process for generating a CID during the paging section 120.

The data transmission section 130 is a section for transmitting/receiving actual data. The present exemplary embodiment divides the data transmission section into a data transmission section for broadcast and a data transmission section for unicast. That is, in the case where the data transmission section 130 is formed of m data transmission slots 130-1 to 130-$m$, n data transmission slots 130-1 to 130-$n$ positioned at a start portion among the m data transmission slots may be set to the data transmission section for broadcast. The rest of the data transmission slots 130-$n$+1 to 130-$m$ may be set to the data transmission slots for unicast. At this point, the data transmission section for broadcast should be set in advance by a company or a designer and each device should be aware of the data transmission section for broadcast set in advance. Therefore, all devices may receive data broadcast from neighbor devices during the data transmission section for broadcast.

More particularly, according to the present exemplary embodiment, the data transmission section for broadcast may be extended depending on the case. That is, in the case where a size of a resource required for data broadcast of a device is greater than a resource size of the data transmission section set in advance, the device may extend and use the broadcast data transmission section. For extending the broadcast data transmission section, according to the present exemplary embodiment, each device performing broadcast transmits extension information representing whether a resource is extended. The extension information is transmitted via a foremost portion of the data transmission section. That is, as illustrated in FIG. 1, extension information representing whether a broadcast resource section is extended is transmitted via a start portion 131 of a first data transmission slot 130-1 forming the data transmission section, and data of each device is broadcast via a different portion 132. Accordingly, all devices should receive a signal of the section via which the extension information is transmitted in the broadcast data transmission. In other words, since a unicast data transmission section may change depending on whether a broadcast data transmission section of each device is extended, each device should receive the extension information to determine a start position of a unicast data transmission section. Therefore, each device may receive a signal of a section via which extension information is transmitted among the broadcast data transmission section to determine a start position of a unicast data transmission section, and then may or may not receive data broadcast via the rest of the section when needed.

When the broadcast data resource section is extended, a maximum size of an extendable resource should be limited, and the size of the extendable resource may be fixed or variable depending on a design scheme. For example, each device may extend and use a broadcast data transmission section by a predetermined size unit set in advance and may extend and use the broadcast data transmission section by only a needed resource size.

Additionally, the device may transmit additional information for broadcast data during a section via which the extension information 131 is transmitted in the data transmission section. Here, the additional information for the broadcast data may be a type of the broadcast data or category information.

Also, according to the present exemplary embodiment, in the case where a plurality of devices intend to simultaneously broadcast data, a resource of the broadcast data transmission sections 130-1 to 130-n may be divided into a plurality of resources, so that each device may use the plurality of divided resources in sequence. Here, the order of each device may be determined depending on a priority of each device, and the priority of each device may be set in various methods. For example, the priority of each device may be determined depending on an index of a resource via which each device has transmitted indicate information during the retrieve section 110. At this point, in the case where the number of devices that intend to broadcast data is greater than the plurality of resources, the present exemplary embodiment allows a plurality of devices to use the plurality of resources depending on a priority of each device, and then allows the remaining devices to transmit resources via the next data transmission section. For example, since the paging section 120 and the data transmission section 130 may repeatedly appear between the retrieve section 110 and the next retrieve section, devices that have not been allocated a broadcast data transmission resource included in a current data transmission section 130 are allocated a resource corresponding to a data transmission section (not shown) after the next paging section (not shown) to broadcast data.

Also, according to the present exemplary embodiment, in the case where a plurality of devices intend to simultaneously broadcast data, a plurality of terminals may simultaneously use a resource of the broadcast data transmission sections 130-1 to 130-n. In this case, each device scrambles data using a specific ID to broadcast the same. At this point, the specific ID is an ID that each device uses when transmitting its device information. The specific ID may be a device Media Access Control (MAC) address, a device ID, an application ID operated by a device, etc. Therefore, other devices may extract data of a desired device among data received from a plurality of devices during the broadcast data transmission sections 130-1 to 130-n by obtaining IDs of devices indicating that they perform broadcast via broadcast indicate information in the retrieve section 110.

Also, according to the present exemplary embodiment, in the case where a plurality of devices intend to simultaneously broadcast data, a method of dividing a resource of the broadcast data transmission sections 130-1 to 130-n into a plurality of resources to allow each device to use the plurality of divided resources in sequence, and a method of allowing a plurality of terminals to simultaneously use the same resource of the broadcast data transmission sections 130-1 to 130-n may be used in combination. At this point, for a more efficient use of a resource, the method of allowing each device to use the plurality of divided resources in sequence depending on a priority may be allowed to have a higher priority than the method of allowing a plurality of terminals to simultaneously use the same resource.

As described above, in the case where a plurality of devices intend to simultaneously broadcast data, each device may determine its priority and the priorities of other devices to determine its broadcast data transmission section depending on the method determined in advance.

Here, since the data broadcast of a device transmits data to a plurality of devices, not a specific device and does not require a response to transmitted data, the data broadcast of a device does not require a process for setting a modulation scheme and an encoding rate depending on a channel state with a specific device and an ACKnowledgement (ACK)/Negative ACKnowledgement (NACK) transmission/reception process. Therefore, as illustrated in FIG. 1, unicast data transmission sections 130-n+1 to 130-m include a connection scheduling section 133, a rate scheduling section 134, a data section 135, and an ACK/NACK section 136, but the broadcast data transmission sections 130-1 to 130-n do not include the connection scheduling section, the rate scheduling section, and the ACK/NACK section.

Now, a case where each device broadcasts data and receives broadcast data based on the above-described frame structure is described. In the following, for convenience in description, FIG. 2 assumes a device that broadcasts data and FIG. 3 assumes a device that receives broadcast data.

Figure 2:
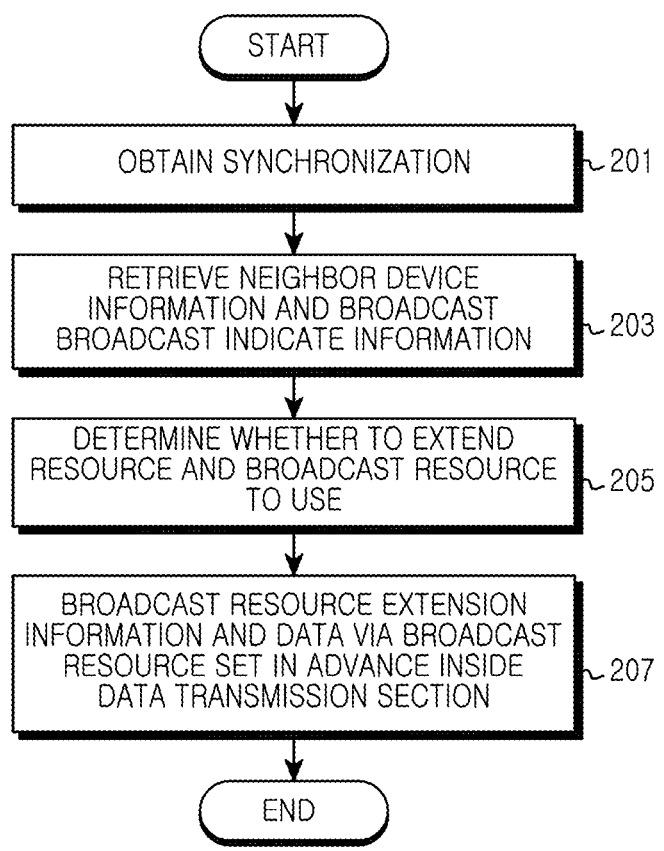
FIG. 2 is a flowchart illustrating a broadcast procedure of a device in an inter-device direct communication system according to an exemplary embodiment of the present invention.

FIG. 2 is a flowchart illustrating a broadcast procedure of a device in an inter-device direct communication system according to an exemplary embodiment of the present invention.

Referring to FIG. 2, the device obtains synchronization with a neighbor device in step 201 and proceeds to step 203 to perform a retrieve process of broadcasting its device information and receiving device information broadcast from a neighbor device via a predetermined resource at a predetermined time point so as to share device information with the neighbor device. At this point, according to the present exemplary embodiment, the device includes broadcast indicate information in the device information and broadcasts the same. The broadcast indicate information represents an indication of whether data is broadcast during the data transmission section. Of course, at this point, the device may receive device information including the broadcast indicate information from a neighbor device.

After that, the device determines whether to extend a resource for the broadcast data transmission section and determines a broadcast resource to use in step 205. At this point, the device compares a resource size required for transmitting data to broadcast with a resource size of a predetermined broadcast data transmission section to determine whether to extend a resource used for the broadcast data transmission. Also, the device determines a broadcast resource to use with consideration of neighbor devices that intend to broadcast data at the same time point. For example, the device may determine priorities of the neighbor broadcast devices and itself based on indexes of resources occupied during the retrieve process by the neighbor devices that intend to broadcast data at the same time point, and determine a resource to use with consideration of the determined priority. At this point, the device may determine to use a broadcast resource corresponding to the priority of itself depending on a predetermined resource use method, and determine to use the same broadcast resource as a predetermined number of neighbor broadcast devices. Here, in a case of using the same broadcast resource as that of the neighbor devices, each device should scramble data using a predetermined ID to broadcast the same.

After that, the device proceeds to step 207 to transmit the information representing whether to extend a resource via a predetermined broadcast data transmission section inside the data transmission section, and broadcast data via a determined resource inside the broadcast data transmission section. At this point, the device may receive a signal from a neighbor device during the section for transmitting information representing whether to extend a resource, and accordingly, receives information as to whether a neighbor device extends a resource. Here, in the case where a neighbor device having a higher priority than the device broadcasts information representing that it extends a resource, the device may re-determine a broadcast resource to use with consideration of a resource use state of the neighbor device.

Figure 3:
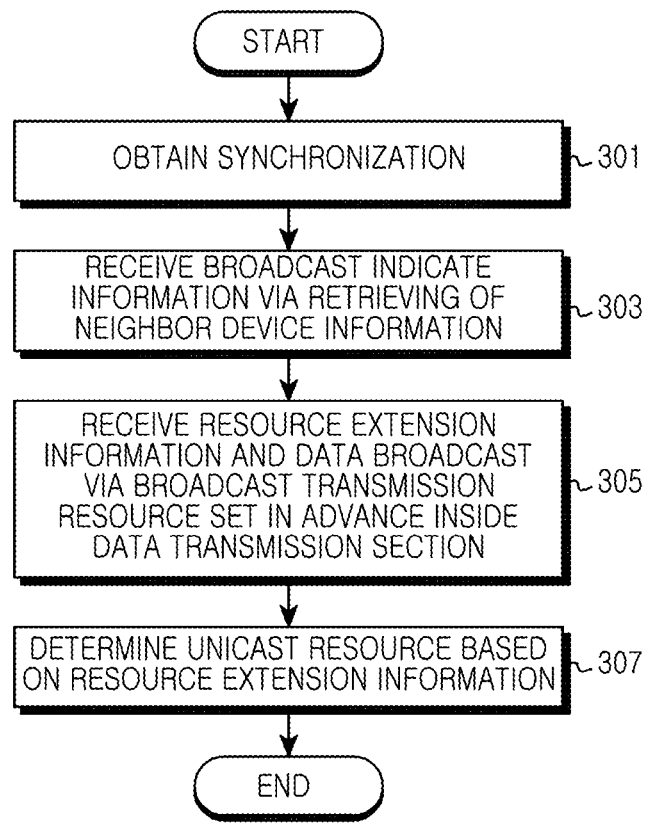
FIG. 3 is a flowchart illustrating a procedure for receiving broadcast data of a device in an inter-device direct communication system according to an exemplary embodiment of the present invention.

FIG. 3 is a flowchart illustrating a procedure for receiving broadcast data of a device in an inter-device direct communication system according to an exemplary embodiment of the present invention.

Referring to FIG. 3, the device obtains synchronization with a neighbor device in step 301, and proceeds to step 303 to perform a retrieve process for broadcasting its device information and receiving device information broadcast from a neighbor device via a predetermined resource at a predetermined time point so as to share device information with the neighbor device. At this point, according to the present exemplary embodiment, the device includes broadcast indicate information into the device information and broadcasts the same. The broadcast indicate information represents an indication of whether data is broadcast during the data transmission section. Of course, at this point, the device may receive device information including the broadcast indicate information from a neighbor device.

After that, the device receives the information representing whether to extend a resource and broadcast data via a predetermined broadcast data transmission section inside a data transmission section in step 305. Here, the device receives a signal of a section via which extension information is transmitted among the broadcast data transmission section, and may not receive data broadcast via the data transmission section when needed. Here, the device receives a signal of the section via which the extension information is transmitted because it requires the extension information in determining a start position of a unicast data transmission section.

After that, the device proceeds to step 307 to determine a start position of the unicast data transmission section based on the extension information, and ends the algorithm according to the present invention.

Figure 4:
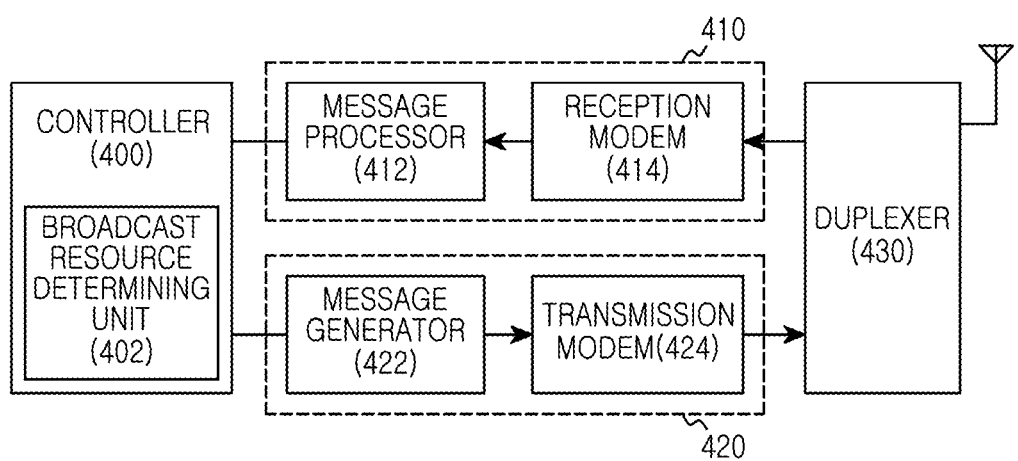
FIG. 4 is a block diagram illustrating a device in an inter-device direct communication system according to an exemplary embodiment of the present invention.

FIG. 4 is a block diagram illustrating a device in an inter-device direct communication system according to an exemplary embodiment of the present invention.

Referring to FIG. 4, the device includes a controller 400, a receiver 410, a transmitter 420, and a duplexer 430.

The controller 400 controls an overall operation of the device. Specifically, the controller 400 controls and processes an operation for broadcasting data according to the frame structure illustrated in FIG. 1.

First, the controller 400 obtains synchronization with a neighbor device, and then controls and processes a function for exchanging device information with a neighbor device during a retrieve section. More particularly, the controller 400 controls and processes a function for transmitting/receiving broadcast indicate information during the retrieve section depending on whether there is data to broadcast. Here, the broadcast indicate information denotes information representing whether a relevant device broadcasts data during the data transmission section. That is, the controller 400 controls to transmit broadcast indicate information representing that it broadcasts data to a neighbor device during the retrieve section when there is data to broadcast, and controls to transmit broadcast indicate information representing that it does not transmit data to a neighbor device during the retrieve section when there is not data to broadcast. Also, the controller 400 controls and processes a function for receiving broadcast indicate information from a neighbor device.

In addition, the controller 400 determines a broadcast resource that each of a plurality of devices is to use in the case where the plurality of devices intend to simultaneously broadcast data by including a broadcast resource determining unit 402. That is, the controller 400 determines a broadcast resource that each of devices indicating that it performs data broadcast is to use via the broadcast indicate information. Here, as illustrated in FIG. 1, the controller 400 divides a data transmission section into a data transmission section for broadcast and a data transmission section for unicast to determine a broadcast resource of each device depending on a predetermined scheme inside the broadcast data transmission section. For example, in the case where a plurality of devices intend to simultaneously broadcast data, the controller 400 may determine a broadcast resource so that the plurality of devices may use the same broadcast resource according to a predetermined scheme, and may sequentially determine a broadcast resource with consideration of priority of each of the plurality of devices. Also, the controller 400 may use a method of sequentially using a broadcast resource with consideration of a priority of each of the plurality of devices and a method of allowing the plurality of devices to use the same resource in combination. At this point, in the case where the plurality of devices use the same broadcast resource, the controller 400 controls and processes a function for scrambling broadcast data with a specific ID and transmitting the same. Also, the controller 400 may determine a priority of each device with consideration of an index of a broadcast indicate information transmission resource representing a time point at which each device has transmitted broadcast indicate information.

Also, the controller 400 compares a size of a resource required for data broadcast with a resource size of the data transmission section set in advance, and when the size of the resource needed for the data broadcast is greater than the resource size of the data transmission section set in advance, controls and processes a function for extending the broadcast data transmission section. At this point, for extending a broadcast data transmission section, the controller 400 controls to transmit extension information representing whether to extend and use a resource via a foremost portion of a data transmission section and controls to broadcast data of each device during other sections as illustrated in FIG. 1.

In addition, the controller 400 receives a signal from a neighbor device during a section via which the extension information is transmitted to determine whether a neighbor broadcast device extends a resource, and controls and processes a function for receiving data broadcast from neighbor devices via the broadcast data transmission section. At this point, the controller 400 may determine a unicast data transmission section considering whether each device extends a broadcast data transmission section, and may or may not receive data broadcast from neighbor devices when needed.

Also, the controller 400 may control to transmit additional information for broadcast data such as type (or category) information of relevant broadcast data during a section via which the extension information is transmitted among the data transmission section.

The receiver 410 receives data transmitted by neighbor devices and a control information message from a duplexer 430. For example, the receiver 410 includes a reception modem 414 and a message processor 412.

The reception modem 414 converts data transmitted by neighbor devices and a control information message provided from the duplexer 430 into a digital signal. Here, the reception modem 414 may descramble the message received from the neighbor devices using a specific ID obtained during a retrieve process under the control of the controller 400.

The message processor 412 analyzes data and a control information message provided from the reception modem 414 to transmit the same to the controller 400. For example, the message processor 412 extracts device information and broadcast indicate information from a message transmitted by neighbor devices during the retrieve process to provide the same to the controller 400. Also, the message processor 412 extracts extension information representing whether a resource is extended and broadcast data from a message received from neighbor devices during a data transmission section to provide the same to the controller 400.

The transmitter 420 transmits data to be transmitted to neighbor devices and a message including control information to the duplexer 430. For example, the transmitter 420 includes a message generator 422 and a transmission modem 424.

The message generator 422 generates data to be transmitted to neighbor devices and a message including control information under control of the controller 400. For example, the message generator 422 generates a message including device apparatus information and broadcast indicate information, and generates a message including extension information representing whether a resource is extended and broadcast data.

The transmission modem 424 converts a message to be transmitted to neighbor devices so that the message is transmitted via a radio resource and transmits the same to the duplexer 430. Here, the transmission modem 424 may scramble a message including the extension information and broadcast data using a specific ID under control of the controller 400.

The duplexer 430 transmits a transmission signal provided from the transmitter 420 via an antenna and provides a reception signal from the antenna to the receiver 420.

As described above, according to exemplary embodiments of the present invention, an inter-device direct communication system informs whether to broadcast via a process for retrieving a neighbor device, and performs broadcast during a predetermined resource section, so that a separate connection ID for broadcast does not need to be generated. Therefore, a process is simplified and simultaneously, overhead may be reduced and an entire system complexity may be reduced.

While the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described exemplary embodiments but should be determined by not only the appended claims but also the equivalents thereof.

What is claimed is:

1. A method of a device for broadcasting data using a frame structure having a plurality of sections in a system supporting device to device communication, the method comprising:
   determining whether there is data to broadcast;
   transmitting first broadcast information to at least one of neighbor devices via a first section, the first broadcast information representing whether the device broadcasts data via a second section;
   receiving second broadcast information from the at least one of the neighbor devices via the first section, the second broadcast information representing whether the at least one of the neighbor devices from which the first broadcast information is received broadcasts data via the second section; and
   receiving the broadcast data based on the second broadcast information via the second section.

2. The method of claim 1, wherein the second section is divided into a broadcast section and a unicast section such that the broadcast section is positioned at a start portion of the second section.

3. The method of claim 2, further comprising:
   when there is data to broadcast, comparing a resource size needed for broadcasting data with a resource size of the broadcast section;
   when the resource size needed for broadcasting data is greater than the resource size of the broadcast section, determining to extend a resource;
   broadcasting resource extension information via the broadcast section of the second section; and
   broadcasting the data using the extended resource via the broadcast section.

4. The method of claim 3, wherein the resource extension information is transmitted via a start portion of the broadcast section.

5. The method of claim 3, further comprising:
   receiving the resource extension information representing whether a neighbor device extends a resource via a start portion of the broadcast section; and
   determining a start position of the unicast section in the second section depending on the resource extension information of the device and the neighbor device.

6. The method of claim 3, further comprising:
when there is data to broadcast, determining, at the device, a broadcast resource during the broadcast section based on the second broadcast information of the at least one of the neighbor devices.

7. The method of claim 6, wherein the determining of the broadcast resource comprises:
determining neighbor devices that are to broadcast based on the second broadcast information; and
sequentially determining a resource for each of the device and the neighbor devices that are to broadcast within the broadcast section based on priorities of the device and the neighbor devices that are to broadcast.

8. The method of claim 7, wherein the priorities of the device and the neighbor devices are determined depending on indexes of resources via which the first broadcast information and the second broadcast information are transmitted.

9. The method of claim 6, wherein the determining of the broadcast resource comprises:
determining the at least one of the neighbor devices that are to broadcast based on the second broadcast information; and
determining that a plurality of devices that broadcast use a same resource within the broadcast section.

10. The method of claim 9, further comprising:
when the plurality of devices use the same resource within the broadcast section, scrambling data using an ID used when transmitting the first broadcast information to the at least one of the neighbor devices via the first section,
wherein the ID comprises at least one of a Media Access Control (MAC) address, a device ID, and an application ID in operation in a device.

11. An apparatus of a device for broadcasting data using a frame structure having a plurality of sections in a system supporting device to device communication between devices, the apparatus comprising:
a transceiver for at least one of transmitting to at least one neighbor device and receiving from at least one neighbor device; and
a controller for determining whether there is data to broadcast, for transmitting first broadcast information to at least one of neighbor devices via a first section, the first broadcast information representing whether the device broadcasts data via a second section, for receiving second broadcast information from the at least one of the neighbor devices via the first section, the second broadcast information representing whether the at least one of the neighbor devices from which the first broadcast information is received broadcasts data via the second section, and for receiving the broadcast data based on the second broadcast information via the second section.

12. The apparatus of claim 11, wherein the controller divides the second section into a broadcast section and a unicast section such that the broadcast section is positioned at a start portion of the second section.

13. The apparatus of claim 12, wherein the controller controls functions for,
when there is data to broadcast, comparing a resource size needed for broadcasting data with a resource size of the broadcast section,
when the resource size needed for broadcasting data is greater than the resource size of the broadcast section, determining to extend a resource,
broadcasting resource extension information via the broadcast section of the second section, and
broadcasting the data using the extended resource via the broadcast section.

14. The apparatus of claim 13, wherein the controller transmits the resource extension information via a start portion of the broadcast section.

15. The apparatus of claim 13, wherein the controller receives the resource extension information representing whether a neighbor device extends a resource via a start portion of the broadcast section, and determines a start position of the unicast section in the second section depending on the resource extension information of the device and the neighbor device.

16. The apparatus of claim 13, wherein, when there is data to broadcast, the controller determines a broadcast resource during the broadcast section based on the second broadcast information of neighbor devices.

17. The apparatus of claim 16, wherein the controller determines neighbor devices that are to broadcast based on the second broadcast information of the neighbor devices, and sequentially determines a resource for each of the device and the neighbor devices that are to broadcast within the broadcast section based on priorities of the device and the neighbor devices that are to broadcast.

18. The apparatus of claim 17, wherein the controller determines the priorities of the device and the neighbor devices depending on indexes of resources via which the first broadcast information and the second broadcast information are transmitted.

19. The apparatus of claim 16, wherein the controller determines neighbor devices that are to broadcast based on the second broadcast information, and determines that a plurality of devices that broadcast use the same resource within the broadcast section.

20. The apparatus of claim 19,
wherein, when the plurality of devices use the same resource within the broadcast section, the controller controls the transceiver to scramble data using an ID used when transmitting the first broadcast information to the at least one of the neighbor devices via the first section, and
wherein the ID comprises at least one of a Media Access Control (MAC) address, a device ID, and an application ID in operation in a device.

* * * * *